T. E. LINFOOT.
ANIMAL NOSE YOKE.
APPLICATION FILED JULY 14, 1916.

1,275,277.

Patented Aug. 13, 1918.

Witness

Inventor
T. E. Linfoot.
By _____ Attorney

UNITED STATES PATENT OFFICE.

THEODOSIA E. LINFOOT, OF LAMBERT, OKLAHOMA.

ANIMAL NOSE-YOKE.

1,275,277.   Specification of Letters Patent.   Patented Aug. 13, 1918.

Application filed July 14, 1916. Serial No. 109,323.

*To all whom it may concern:*

Be it known that I, THEODOSIA E. LINFOOT, a citizen of the United States, residing at Lambert, in the county of Alfalfa and State of Oklahoma, have invented certain new and useful Improvements in Animal Nose-Yokes; and I do hereby declare the following to be a full, clear, and exact description of the invention, such as will enable others skilled in the art to which it appertains to make and use the same.

This invention relates to a simple and effective device of novel construction for preventing stock from leaving an inclosure, by either jumping a fence, or tearing down the same and the invention consists in a ring which is secured to the cartilage or septum of an animal's nose and which has a chain attached thereto and hanging from the lower portion of the ring.

A further object of this invention is to bend the ring to form a loop in which the chain is attached, which prevents the chain from traveling around the ring.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1:
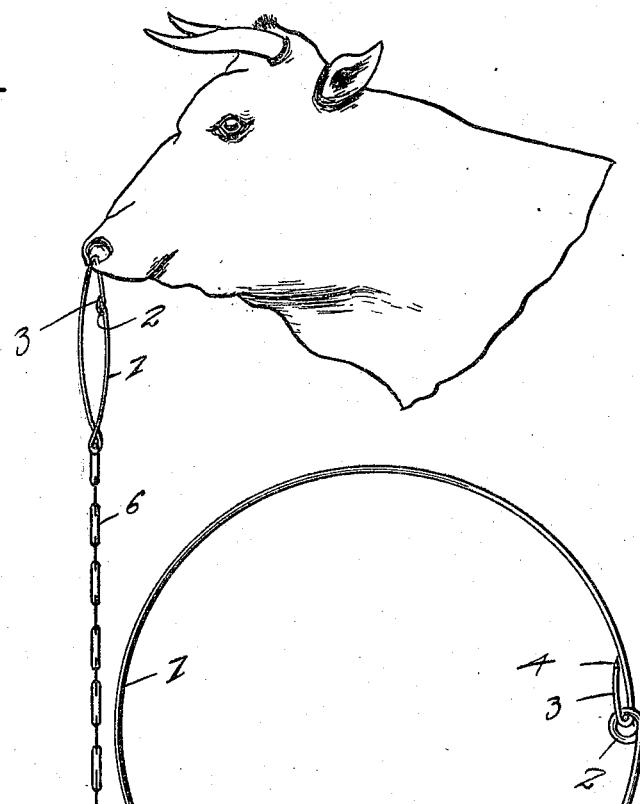
Figure 1 is a view showing the invention applied.
Figure 2:
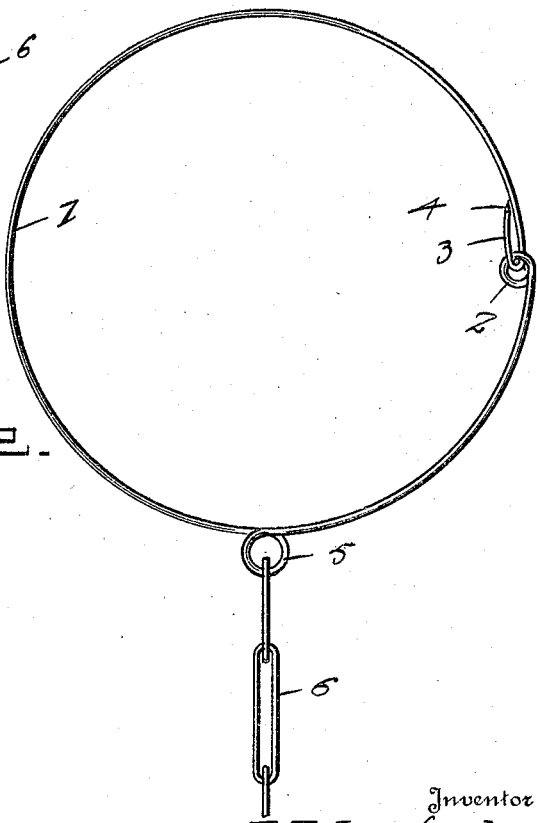
Fig. 2 is a detail view of the invention having part of the same broken away.

Referring more particularly to the drawing, 1 designates the ring, which is secured to the cartilage or septum of an animal's nose as illustrated in Fig. 1 of the drawing. The ring 1 is preferably constructed of steel wire, and it has a loop 2 formed upon one end of the same and a hook 3 formed upon the other end. The terminal of the hook 3 is pointed as indicated at 4 for insertion through the cartilage of the animal's nose. In applying the ring to an animal's nose, the end of the wire of which the ring is formed, upon which the hook 3 is formed, is inserted through the cartilage or septum of the animal's nose after which the end is passed through the loop 2 and bent to form the hook 3. If it is desired, the end 3 of the wire may be twisted about a portion of the ring for preventing accidental disconnection between the hook-shaped end 3 and the loop 2.

The wire of which the ring 1 is formed is curved to form a ring or loop 5 which is positioned exteriorly of the ring 1. A chain 6 is attached to the ring or loop 5 and hangs downwardly therefrom as shown in Fig. 1 of the drawing.

The ring 1 is preferably large enough to permit the animal to which it is attached to eat through the ring. In case an animal to which the yoke is attached endeavors to go through, over or under a barbed wire fence, the dangling chain 6 will catch on one of the barbs of the wire and prevent the animal from going through, over or under the fence.

In reducing the invention to practice certain minor features of construction, combination and arrangement of parts may necessitate alteration to which the patentee is entitled, provided such alterations are comprehended within the scope of what is claimed.

What is claimed is:—

A nose yoke for cattle including a ring constructed of a single strand of wire having one end sharpened for insertion through the cartilage of an animal's nose, a loop formed upon the opposite end of the wire, said pointed end being extended through the loop and bent back upon itself for connecting the ends of the wire together, said strand of wire being bent intermediate its ends to form an inclosed loop at the bottom portion thereof, and a flexible chain connected to and extending through and downwardly from the loop, whereby the chain is prevented from moving circumferentially around the ring.

In testimony whereof I affix my signature in presence of two witnesses.

THEODOSIA E. LINFOOT.

Witnesses:
GEO. WEABER,
E. P. REED.

Copies of this patent may be obtained for five cents each, by addressing the "Commissioner of Patents, Washington, D. C."